(12) United States Patent
Wang et al.

(10) Patent No.: US 10,116,427 B2
(45) Date of Patent: Oct. 30, 2018

(54) FULL-DUPLEX TRANSMISSION MODES FOR WIRELESS NETWORKS

(71) Applicant: Intel Corporation, Santa Clara, CA (US)

(72) Inventors: Ping Wang, San Jose, CA (US); Shu-Ping Yeh, Campbell, CA (US); Yang-Seok Choi, Portland, OR (US); Shilpa Talwar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 15/279,321

(22) Filed: Sep. 28, 2016

(65) Prior Publication Data

US 2018/0091283 A1     Mar. 29, 2018

(51) Int. Cl.
*H04L 5/14*     (2006.01)
*H04W 52/24*     (2009.01)
*H04W 52/30*     (2009.01)

(52) U.S. Cl.
CPC ......... *H04L 5/1461* (2013.01); *H04W 52/243* (2013.01); *H04W 52/245* (2013.01); *H04W 52/30* (2013.01)

(58) Field of Classification Search
CPC .............. H04L 5/1461; H04W 52/243; H04W 52/245; H04W 52/30
See application file for complete search history.

(56) References Cited

U.S. PATENT DOCUMENTS

| | | | | |
|---|---|---|---|---|
| 5,533,029 A | * | 7/1996 | Gardner | ................ H04W 88/10 370/329 |
| 9,832,758 B2 | * | 11/2017 | Kneckt | ................ H04W 72/04 |
| 2015/0078215 A1 | * | 3/2015 | Zhou | ...................... H04L 5/003 370/277 |

OTHER PUBLICATIONS

"802.16fTM-IEEE Standard for Local and Metropolitan Area Networks, Part 16: Air Interface for Fixed Broadban Wireless Access Systems, Amendment 1: Management Information Base", IEEE Std. 802.16fTM-2005, (2005), 257 pgs.
"IEEE standard Part 11: wireless LAN medium access control (MAC) and physical layer (PHY) specification", (ISO/IEC 8802-11, ANSI/IEEE Std 802.11 physical layer (PHY) specification. (ISO/IEC 8802-11, ANSI/IEEE Std 802.111999), (Aug. 20, 1999), 123-137.
Goyal, Sanjay, et al., "A distributed MAC protocol for full duplex radio", IEEE Computer Society—Signals, Systems and Computers, 2013 Asilomar Conference, (2013), 788-792.
Kim, Jae Young, et al., "Janus: A Novel MAC Protocol for Full Duplex Radio", Stanford University, (2013), 12 pgs.

(Continued)

*Primary Examiner* — Mohammad S Anwar
(74) *Attorney, Agent, or Firm* — Schwegman Lundberg & Woessner, P.A.

(57) ABSTRACT

Methods and devices are described for enabling different transmission modes that include full-duplex modes in a wireless network are described. A medium access control layer design is described that enables evaluation of interferences that would result from a transmission mode in order to facilitate decision making by the network access point and the wireless stations associated therewith in selecting a particular transmission mode. Signaling techniques for setting up the different transmission techniques are also described.

25 Claims, 8 Drawing Sheets

(56) References Cited

OTHER PUBLICATIONS

Singh, Nikhil, et al., "Efficient and Fair MAC for Wireless Networks with Self-interference Cancellation", Microsoft Research, UK University of Illinois at Urbana Champaign University of Southern California, (2011), 8 pgs.

Tang, Aimin, et al., "A-Duplex: Medium Access Control for Efficient Coexistence Between Full-Duplex and Half-Duplex Communications", IEEE Transactions on Wireless Communications, vol. 14, No. 10 (Oct. 2015), 15 pgs.

\* cited by examiner

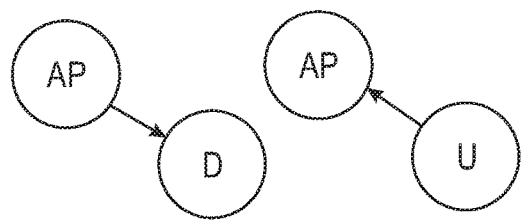
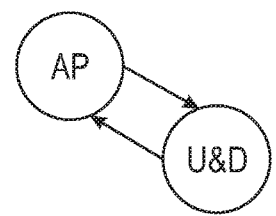
FIG. 2A
FIG. 2B
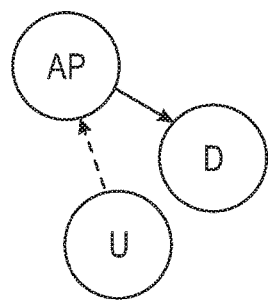
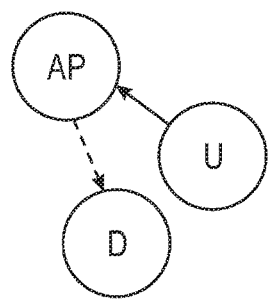
FIG. 2C
FIG. 2D
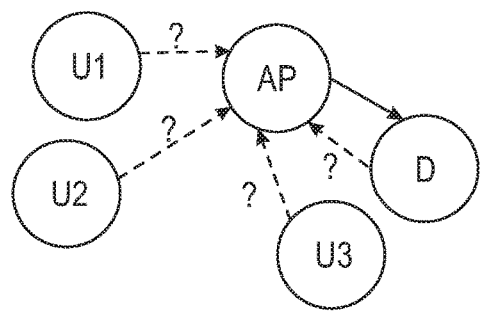
FIG. 3

FULL-DUPLEX TRANSMISSION MODES FOR WIRELESS NETWORKS

TECHNICAL FIELD

Embodiments described herein relate generally to wireless networks and communications systems.

BACKGROUND

Wireless networks as defined by the IEEE 802.11 specifications (sometimes referred to as Wi-Fi) are currently being advanced to provide much greater average throughput per user to serve future communications needs. The IEEE 802.11ax standard incorporates features that include, for example, downlink and uplink multi-user (MU) operation by means of orthogonal frequency division multiple access (OFDMA) and multi-user multiple-input-multiple-output (MU-MIMO) technologies. Further gains in spectral efficiency may be obtained through the use of full-duplex communications links. Full-duplex communication in a wireless communications context refers to the simultaneous transmission and reception by radios using the same frequency resource.

BRIEF DESCRIPTION OF THE DRAWINGS

FIGS. 2A-2D illustrate half-duplex, dual node full-duplex, three-node source-based full-duplex, and three-node destination-based full-duplex modes, respectively, according to some embodiments.

FIG. 3 illustrates possible modes when the AP contends for the channel according to some embodiments.

DETAILED DESCRIPTION

Figure 1:
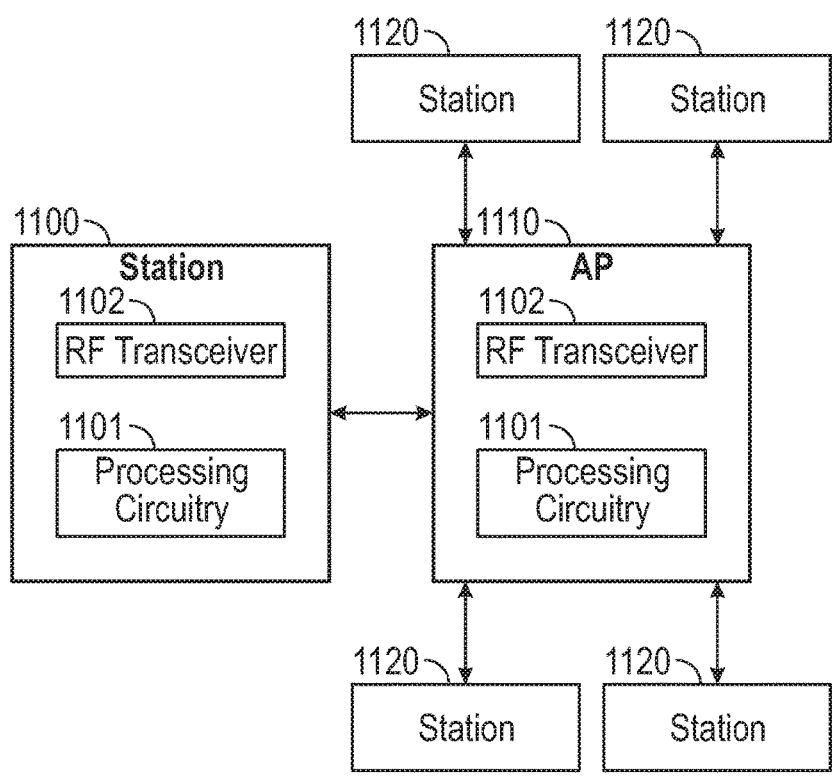
FIG. 1 illustrates a basic service set that includes station devices associated with an access point.

In an 802.11 local area network (LAN), the entities that wirelessly communicate are referred to as stations (STAs). A basic service set (BSS) refers to a plurality of stations that remain within a certain coverage area and form some sort of association and is identified by the SSID of the BSS. In one form of association, the stations communicate directly with one another in an ad-hoc network. More typically, however, the stations associate with a central station dedicated to managing the BSS and referred to as an access point (AP). FIG. 1 illustrates a BSS that includes a station device 1100 associated with an access point (AP) 1110, where the AP 1110 may be associated with a number of other stations 1120. The device 1100 may be any type of device with functionality for connecting to a WiFi network such as a computer, smart phone, or a UE (user equipment) with WLAN access capability, the latter referring to terminals in a LTE (Long Term Evolution) network. Each of the station devices include an RF (radio frequency transceiver) 1102 and processing circuitry 1101 as shown by the depictions of devices 1100 and 1110. The processing circuitry includes the functionalities for WiFi network access via the RF transceiver as well as functionalities for processing as described herein. The RF transceivers of the station device 1100 and access point 1110 may each incorporate one or more antennas. The RF transceiver 1100 with multiple antennas and processing circuitry 101 may implement one or more MIMO (multi-input multi-output) techniques such as spatial multiplexing, transmit/receive diversity, and beam forming. The devices 1100 and 1110 are representative of the wireless access points and stations described below.

In an 802.11 WLAN network, the stations communicate via a layered protocol that includes a physical layer (PHY) and a medium access control (MAC) layer. The MAC layer is a set of rules that determine how to access the medium in order to send and receive data, and the details of transmission and reception are left to the PHY layer. At the MAC layer, transmissions in an 802.11 network are in the form of MAC frames that include data frames and control frames. Data frames carry data from station to station. Control frames, such as request-to-send (RTS) and clear-to-send (CTS) frames are used in conjunction with data frames deliver data reliably from station to station.

The 802.11ax standard provides for downlink (DL) and uplink (UL) multi-user (MU) operation. Multiple simultaneous transmissions to different STAs from the AP in the DL and from multiple STAs to the AP in the UL are enabled via MU-MIMO and/or orthogonal frequency division multiple access (OFDMA). With OFDMA, the AP assigns separate subsets of OFDMA subcarriers, referred to as resource units (RUs), to individual STAs for UL and DL transmissions. With MU-MIMO, multiple antenna beamforming techniques are used to form spatial streams (SSs) that the AP assigns to STAs for UL and DL transmissions.

In 802.11 WLANs, an AP with full-duplex capability is able to simultaneously transmit/receive packets for downlink/uplink traffic. The STAs associated with the AP may be full-duplex capable or only half-duplex capable. FIGS. 2A through 2D illustrate four possible modes of transmission when the AP has full-duplex capability. FIG. 2A illustrates a conventional half-duplex transmission mode where node D represents a STA receiving downlink traffic and node U represents a STA transmitting uplink traffic. FIG. 2B illustrates dual node full-duplex transmission between an AP and a full-duplex capable STA represented by node U&D. FIGS. 2C and 2D illustrate modes in which the AP operates in full-duplex mode to simultaneously transmit downlink traffic to one STA and receive uplink traffic from another STA. Two different situations may be distinguished depending upon whether it is the AP or a STA that initially contends for the channel to establish a primary link. FIG. 2C illustrates a scenario where the AP contends for the channel to provide a downlink transmission to STA D as the primary link and selects a STA U for uplink transmission as the secondary link, referred to herein as a three-node source-based full-duplex link. FIG. 2D illustrates a scenario where a STA U contends for the channel to provide an uplink transmission to the AP as the primary link with a STA D selected by the AP for downlink transmission as the secondary link, referred to herein as a three-node destination-based full-duplex link.

It should be noted that if the wireless network allows for multi-user (MU) downlink transmissions (by OFDMA and/or MU-MIMO), there may be more than one secondary STA D in the three-node destination-based full-duplex link shown in FIG. 2D. Similarly, if the wireless network allows for MU uplink transmissions (by OFDMA and/or MU-MIMO), there may be more than one secondary STA U in the three-node source-based full-duplex link shown in FIG. 2C.

In an ideal scenario, the use of the AP's full-duplex capability in the modes illustrated by FIGS. 2B-2D may potentially double network throughput performance and spectral efficiency. In practical situations, however, whether it would be desirable to use one of those full-duplex transmission modes depends upon variables such as interference levels, traffic patterns, and radio-frequency (RF) conditions. In addition, for the transmission modes illustrated by FIGS. 2C and 2D, the downlink STA D could suffer from STA-to-STA interference due to the transmission of the uplink node U. Described herein are MAC layer designs for supporting the transmission modes illustrated in FIGS. 2A-2D and facilitating decision making on the part of the AP as to which transmission mode to employ. In addition, measurement and signaling techniques are described that enable evaluation of possible STA-to-STA interferences that may arise in the modes illustrated by FIGS. 2C and 2D. In making a decision as to what transmission mode should be used, the AP may employ any type of criteria including, for example, current network conditions, expected overall network throughput and/or fairness for the different transmission modes, and traffic data size information gathered from UEs.

For example, if an AP and a primary STA are full-duplex capable and each has data to send to the other, the preferred transmission mode could be dual node full-duplex transmission as illustrated in FIG. 2B. Note that, unlike the three-node full-duplex modes shown FIGS. 2C and 2D, there is no STA-to-STA interference in this mode. When the dual-node full-duplex mode is not the best choice (e.g., because one node has no data to send or is not full-duplex capable or because of network conditions), the AP may consider half-duplex transmission or the three-node full-duplex modes shown in FIGS. 2C and 2D.

In one embodiment, when a full-duplex AP contends for the channel, the AP may first send an inquiry message to a primary downlink STA to decide if a dual node full-duplex link can be setup. If not, the AP may look for uplink candidate STAs which would not cause an unacceptable level of interference to the primary downlink STA and select one or more of such candidate STAs to act as secondary STAs in a three-node source-based full-duplex link. If no such uplink candidate STAs are found or if it is decided that a half-duplex link with the primary STA would yield better performance, the AP may utilize half-duplex transmission instead.

Similarly, in another embodiment, when a primary STA contends for the channel to setup an uplink transmission to an AP with full-duplex capability, the AP may decide if a dual node full-duplex link would be appropriate based upon whether the AP has data to send to the primary STA, whether the primary STA is full-duplex capable, and network conditions. If no full-duplex link is to be setup with the primary STA, the AP may look for downlink candidate STAs which would not suffer an unacceptable level of interference from the primary STA's uplink transmission and select one or more such candidate STAB to act as secondary STAs in a three node destination-based full-duplex link. If no such downlink candidate STAs are found or if it is decided that a half-duplex link may perform better, the AP may utilize half-duplex transmission for the uplink transmission from the primary STA.

MAC Design when AP Contends the Channel

Embodiments of the MAC layer design that deal with the situation when the AP contends for the channel to transmit downlink data to a primary STA D will now be described. The possible transmission modes in this case are the half-duplex, dual node full-duplex, and three-node source-based modes as illustrated in FIG. 3. The solid arrow represents the downlink connection between the AP and the primary STA D, and the broken arrows represent potential uplink connections between the AP and STAs D, U1, U2, and U3.

Figure 4:
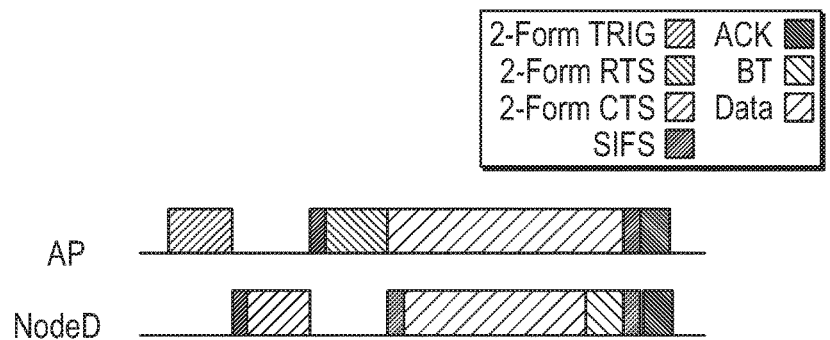
FIG. 4 illustrates the MAC protocol for a dual node full-duplex link according to some embodiments.
Figure 5:
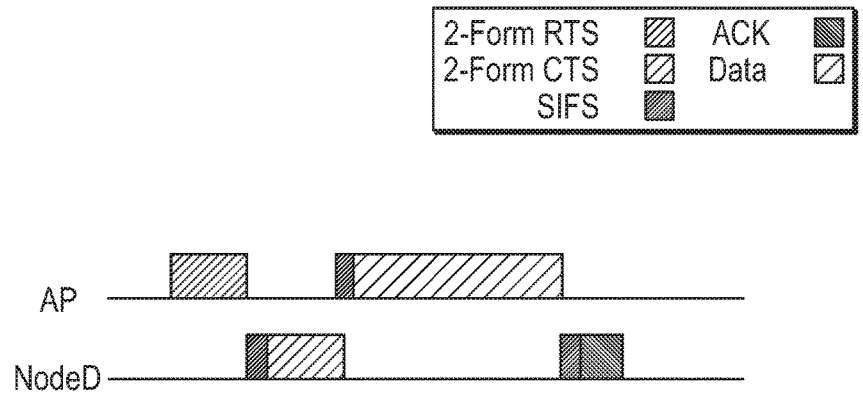
FIG. 5 illustrates the MAC protocol for a half-duplex link according to some embodiments.

When the AP contends the channel and if the downlink primary STA D is also full-duplex capable, the AP may send to STA D a 2-form RTS message to inquire about the possibility of setting up a dual node full-duplex link. When STA D when receives this message, it will reply with a 2-form CTS message indicating whether it has an uplink data request or not and also possibly other information such as the data size or expected transmission duration of the uplink transmission. If the AP decides to use a dual node full-duplex mode with STA D, it will send a 2-form trigger (TRIG) message to STA D. Upon receiving this message, STA D starts the uplink transmission such that full-duplex transmission occurs between the AP and STA D. FIG. 4 illustrates the procedure where frames exchanged between the AP and STA D are separated by the short inter-frame spacing (SIFS) duration. A busy tone (BT) may be appended to STA D's data transmission if is shorter than the AP's data transmission to protect the nodes from the hidden node problem. The AP and STA D each send acknowledgement (ACK) frames if the data transmissions are correctly received. If the AP decides to use half-duplex mode, the AP would send data to STA D after receiving the 2-form CTS, as illustrated in FIG. 5.

Figure 6:
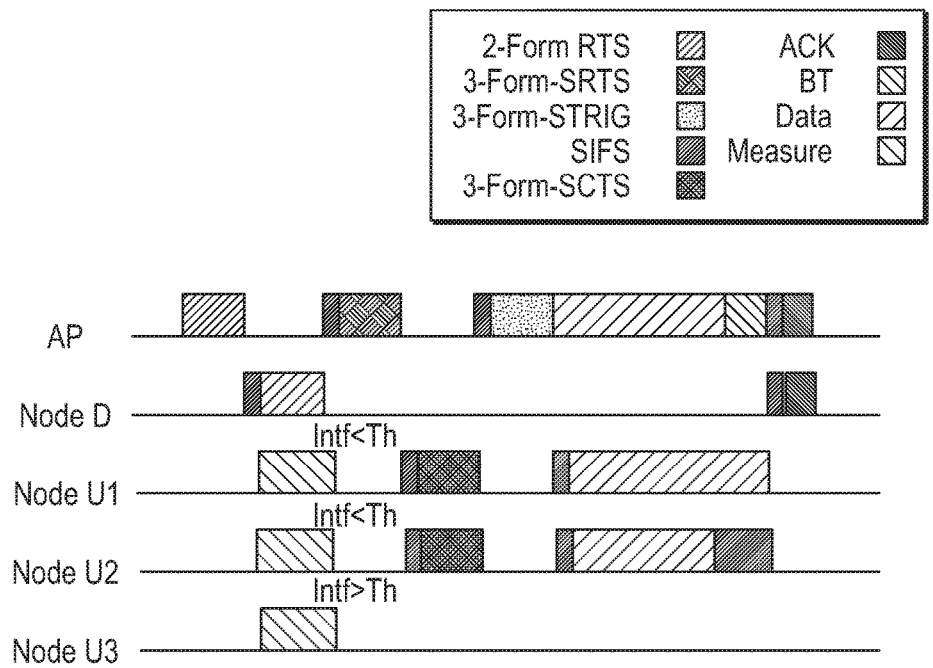
FIG. 6 illustrates the MAC protocol for a three-node source-based full-duplex link according to some embodiments.

If the AP decides to inquire about the possibility of using the three-node source-based full-duplex mode, the AP sends a 3-form S-RTS message. The candidates uplink nodes which have uplink traffic requests will then decide if they should reply to the AP with 3-form S-CTS message or not. In one embodiment, the method by the candidate uplink STA makes this decision may be described as follows. First, the downlink primary STA D transmits its 2-form-CTS message (or the parts of the 2-form CTS message that serve as measurement pilots) with signal power $P_{Xmit}$ where $$P_{Xmit} = K/P_{AP}(|h_{AP \to D}|)^2,$$

and where $P_{AP}(h_{AP \to D}|)^2$ is the measured power level at which the 2-form RTS frame from the AP is received by STA D, $P_{AP}$ is the known power level at which the AP transmits the two-form RTS frame, $|h_{AP \to D}|$ is the channel gain from the AP to STA D, and K is a predefined constant to ensure that the computed transmit power does not exceed a maximum power constraint. Second, uplink candidate nodes (illustrated in FIG. 6 as nodes U1, U2, and U3) listen to the 2-form CTS message and measure the power of the received signal $P_{measured}$ where $$P_{measured} = P_{Xmit} * (|h_{D \to U}|)^2$$

where $|h_{D \rightarrow U}|$ is the wireless channel gain between the STA D and the particular uplink candidate node receiving the 2-form CTS frame (i.e., node U1, U2, or U3). The amount of interference Intf that would be caused to STA by the uplink candidate's participation in the three-node source-based full-duplex link may then be estimated as:

$$\text{Intf} = P_U * P_{measured}$$

where $P_U$ is a predefined transmit power level to be used by the uplink candidate node for uplink transmissions. Third, uplink candidates nodes after hearing the 3-form S-RTS from the AP, then compare their estimated interference Intf with a predefined threshold Th. If Inft<Th, the uplink candidate node can send a 3-form S-CTS message to the AP. Otherwise, the candidate node does not send anything. In FIG. 6, for example, nodes U1-U3 measure the power of the 2-form CTS frame sent by STA D, and each node computes its estimated interference Intf. After the 3-form S-RTS is sent by the AP, nodes U1 and U2 determine that their estimated interferences are below the threshold Th and transmit 3-form S-CTS messages. Node U3, on the other hand, finds its estimated interference Intf to equal or exceed the threshold Th and does not transmit anything.

The AP receives the 3-form S-CTS messages and, if it decides to use the three-node source-based full-duplex mode for downlink node D and one or more uplink nodes (eg., nodes U1 and U2 as illustrated in FIG. 6), it sends out the 3-form source-trigger (S-TRIG) frame to initiate the downlink transmission from the AP to node D and the uplink transmissions from one or more uplink candidate nodes that transmit 3-form S-CTS frames. The 3-form S-TRIG frame may include other information such as the transmission duration and a user ID (or IDs) that informs one or more of the uplink candidate nodes to respond with an uplink data transmission. When there are multiple uplink candidates satisfying the threshold requirement (e.g., STAs U1 and U2 in FIG. 6), there are multiple ways to arrange the 3-form S-CTS message to avoid or reduce the probability of collisions between the uplink transmissions. If OFDMA is supported (such as IEEE 802.11ax or above), the 3-form S-RTS message may contain UL resource allocation information for the STAs associated with the AP. The candidate uplink STAs then reply with their 3-form S-CTS message on corresponding assigned subcarriers (i.e., RUs). FIG. 6 illustrates the case when STAs U1 and U2 transmit their uplink data simultaneously on different subcarriers to the AP while the AP transmits its downlink data to STA D. Alternatively, the AP may pre-allocate subsets of the subcarriers, and the multiple uplink candidates then randomly choose one of the subsets to reply with their 3-form-S-CTS message. When the AP receives the 3-form S-CTS message, it then chooses the corresponding subset where the message is sent or one of the subsets (if multiple messages are received on multiple subsets) to send the 3-form-S-TRIG message. An uplink candidate node that receives the 3-form S-TRIG message on the same subcarriers which it used to transmit its 3-form S-CTS message starts its uplink transmission.

In various embodiments, the 3-form S-CTS message may contain various messages in accordance with a tradeoff between performance and signaling complexity. For example, the 3-form S-CTS message may be just a busy tone so that the AP correspondingly replies with a busy tone in specific subcarriers of the 3-form S-TRIG frame to notify the accepted uplink candidate node (or nodes) and STA D for full-duplex transmission/reception. Alternatively, it can be a message containing more information (e.g., quantized measured interference information) for the AP to decode in order to make better scheduling decisions, such as which candidate uplink node to choose and how power should be allocated to the AP and the downlink and uplink nodes.

Figure 7:
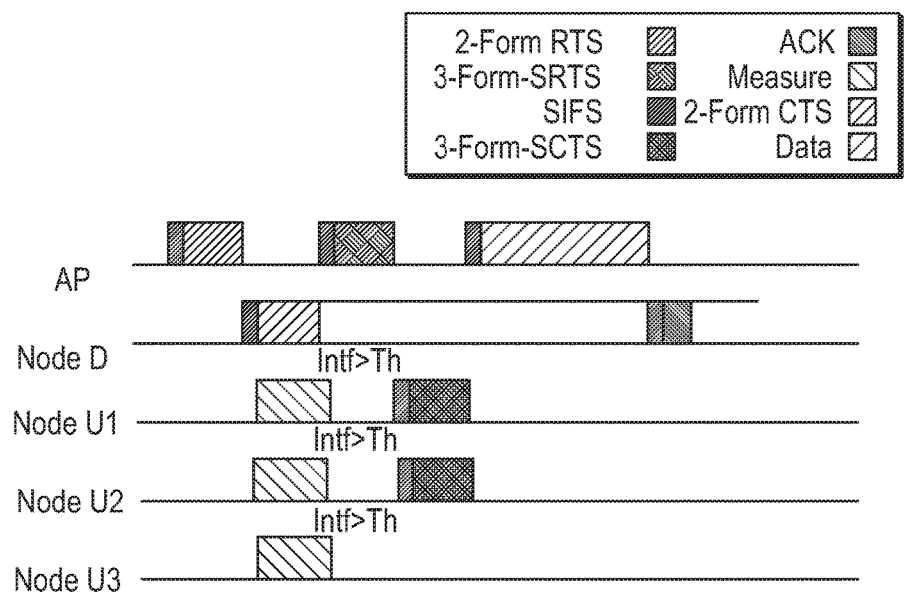
FIG. 7 illustrates the MAC protocol for a half-duplex link after evaluating a three-node source-based full-duplex link according to some embodiments.

There may also be variants or simplifications of the MAC layer design described above for the above transmission modes that depend upon system configuration. For example, the system may not have full-duplex capable STAs. The 2-form CTS may then be simplified so as to constitute a power signal for candidate uplink nodes to measure without any indication as to whether node D has an uplink data transmission request. In another example, after the AP receives the 3-form S-CTS, the AP may decide to use half-duplex mode instead of the 3-node source-based full-duplex mode. In this case, instead of sending the 3-form S-TRIG as shown in FIG. 6, the AP sends data directly to node D in half-duplex mode as shown in FIG. 7.

MAC Design when a STA Contends the Channel

Figure 8:
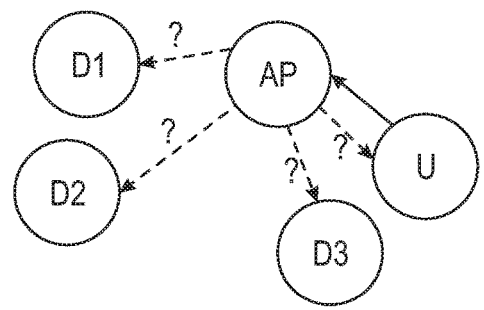
FIG. 8 illustrates possible modes when a STA contends for the channel according to some embodiments

Embodiments of the MAC layer design that deal with the situation when primary STA contends for the channel to transmit uplink data to AP the will now be described. The possible transmission modes in this case are the half-duplex, dual node full-duplex, and three-node destination-based modes as illustrated in FIG. 8. The solid arrow represents the uplink connection between the primary STA U and the AP, and the broken arrows represent potential downlink connections between the AP and STA U and potential downlink connections between the AP and STAs D1, D2, and D3.

Figure 9:
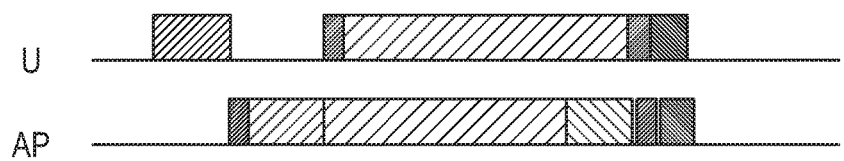
FIG. 9 illustrates the MAC protocol for a dual node full-duplex link according to some embodiments.
Figure 10:
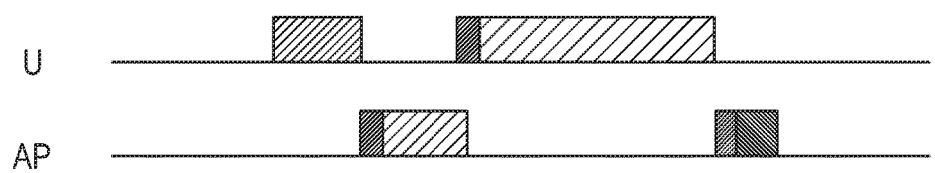
FIG. 10 illustrates the MAC protocol for a half-duplex link according to some embodiments.

When uplink STA U contends for the channel and is also fill-duplex capable, it may send to the AP a 2-form-RTS message to inquire about the possibility of setting up a dual-node full-duplex link with the AP. When the AP receives this message, if it has data to send to STA U, it then decides whether or not to use dual node full-duplex mode with STA U. If the AP decides to us dual node full-duplex mode, it will reply to STA U with a 2-form CTS/TRIG message to trigger STA U's uplink transmission and then also starts its downlink transmission to STA U. FIG. 9 illustrates the procedure where frames exchanged between the AP and STA U are separated by the short inter-frame spacing (SITS) duration. A busy tone (BT) may be appended to the AP's data transmission if is shorter than STA U's data transmission to protect the nodes from the hidden node problem. The AP and STA U each send acknowledgement (ACK) frames if the data transmissions are correctly received. If the AP decides to grant only a half-duplex link to STA U for its uplink transmission, it notifies STA U about this decision in a 2-form CTS message that triggers STA U's uplink transmission as shown in FIG. 10.

Figure 11:
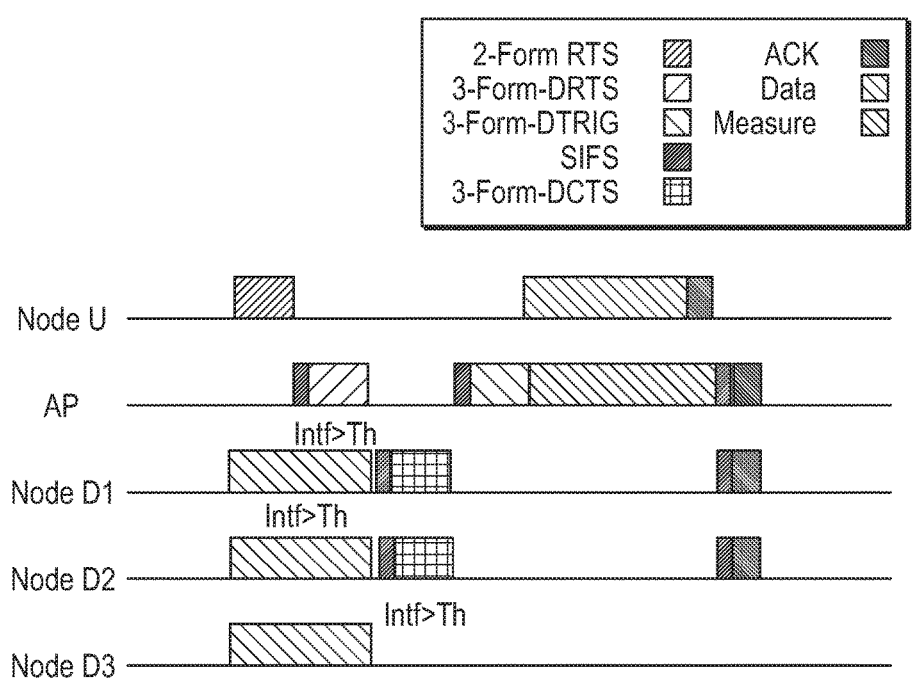
FIG. 11 illustrates the MAC protocol for a three-node destination-based full-duplex link according to some embodiments.

If the AP decides to inquire about the possibility of using the three-node destination-based full-duplex mode after getting the 2-form RTS from STA U, the AP sends a 3-form D-RTS message to downlink candidate nodes (e.g., STAs D1, D2, and D3 as illustrated in FIG. 11) that it has data to send to. The candidate downlink nodes will then measure the interference from uplink STA U in order to decide if a three-node destination-based full-duplex link with the AP would yield acceptable performance. If the measured interference Intf is smaller than a specified threshold Th, a candidate downlink node may then reply to the AP with a 3-form D-CTS message as shown in FIG. 11. In one embodiment, the method by the candidate downlink STA makes the decision as to whether or not to send the 3-form D-CTS message may be described as follows. Uplink STA U transmits its 2-form RTS message with a predefined transmit power level $P_U$. A downlink candidate node then receives the 2-form RTS and measures the received power level as $(P_U*(|h_{U \rightarrow D}|))^2$, where $|h_{U \rightarrow D}|$ is the channel gain from STA U to that candidate downlink node (e.g., node D1, D2, or D3). A downlink candidate nodes also receives the 3-form RTS message transmitted by the AP and measures the received power as $(P_{AP}(|h_{AP \to D}|^2)$, where $P_{AP}$ represents the predefined transmit power level of the AP and $|h_{AP \to D}|$ represents the channel gain from the AP to that particular candidate downlink node. A candidate downlink node may then estimate the amount of interference Intf that would be caused to it by the primary STA's participation in the three-node destination-based full-duplex link as a ratio between the measured power levels of the received two-form RTS and three-form D-RTS frames:

$$\text{Intf}=(P_U^*(|h_{U \to D}|)^2)/(P_{AP}(|h_{AP \to D}|)^2)$$

The candidate downlink nodes then compare the estimated interference Intf with a predefined threshold Th. If the interference ratio is smaller than the threshold, a downlink candidate node sends a 3-form D-CTS message and, otherwise sends no message.

When the AP receives the 3-form D-CTS message, it then decides whether or not to proceed with the 3-node destination-based full-duplex link. If so, the AP sends a 3-form S-TRIG message that informs which candidate downlink node or nodes are selected to participate and starts its downlink transmission(s) to the selected candidate downlink node(s). Uplink STA U is also triggered to start its uplink transmission when it receives the 3-form S-TRIG frame. FIG. 11 illustrates a scenario where nodes D1 and D2 determine that the interference is acceptable and send 3-form D-CTS frames, while node D3 determines that Intf exceeds the threshold Th and does nothing. Nodes D1 and D2 then receive downlink data transmissions from the AP while STA U transmits its uplink data to the AP. There is also a possibility that the AP decides to use half-duplex mode after collecting the 3-form D-CTS messages. The 3-form D-TRIG message may then include a half-duplex mode indicator instead to set up the transmission.

Similar to the case discussed above where the AP contends for the channel, when multiple candidate downlink STAs each find that the interference criterion is satisfied, there are multiple ways to avoid collisions between their transmitted 3-form D-CTS frames and also orthogonalize the data transmissions from the AP to the multiple downlink STAs. If OFDMA is supported (such as in IEEE 802.11ax or above), the 3-form D-RTS message from the AP may contain downlink resource allocation information for the stations associated with the AP. The downlink candidate STAs then reply with their 3-form D-CTS messages on their assigned subcarriers (RUs). FIG. 11 illustrates the case where D1 and D2 use different subsets of the resources so that the downlink data from the AP can be simultaneously received on different subcarriers. Alternatively, the AP can pre-allocate subsets of the subcarriers, and the multiple downlink candidate nodes then randomly choose one of the subsets to reply with their 3-form D-CTS messages. When the AP receives a 3-form D-CTS message, it chooses the corresponding subset on which the message is sent (or subsets if multiple 3-form D-CTS messages are received on multiple subsets) to send the 3-form-D-TRIG message. A downlink candidate STA that receives the 3-form-D-TRIG message on the same subcarrier subset on which it transmitted its 3-form D-CTS frame is then informed that it will be receiving downlink data on that specific subset of subcarriers.

In the examples discussed above where there are simultaneous data transmissions in both directions, a busy tone (BT) is appended for traffic that ends earlier than the other direction's traffic to protect a node from the hidden node problem. Other ways of dealing with this problem include optimizing the traffic to have similar length or including transmission duration information in the various types of TRIG or CTS/RTS frames.

Example UE Description

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 12:
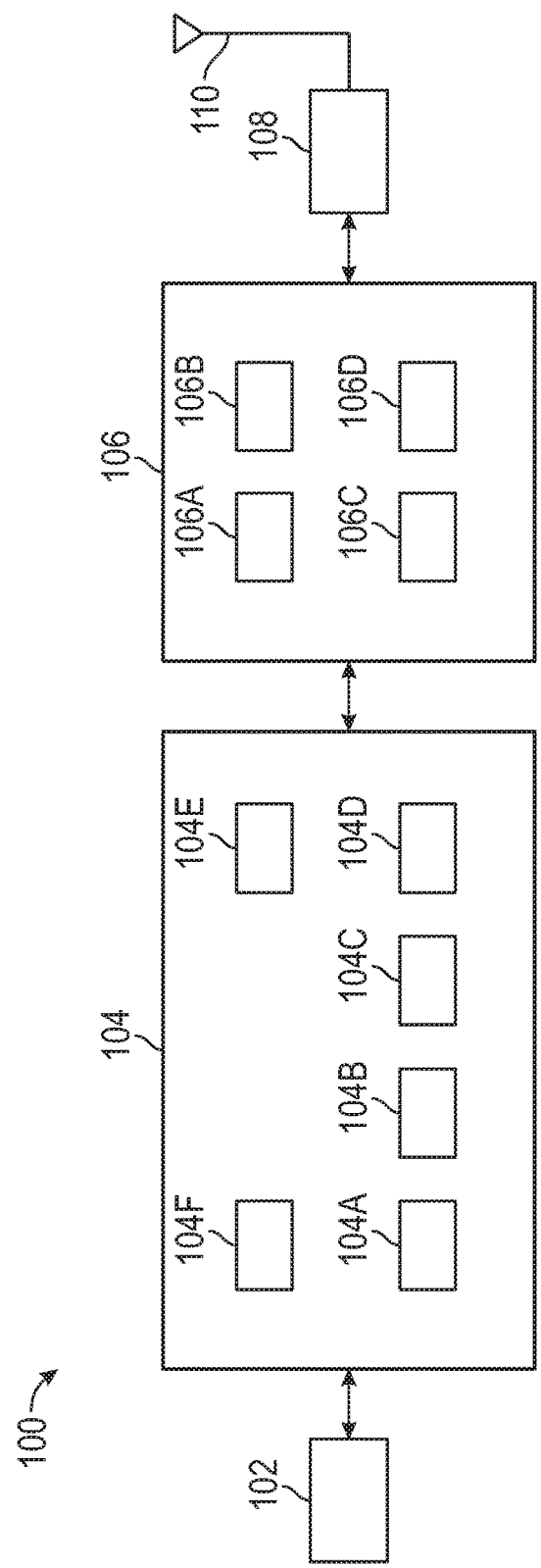
FIG. 12 illustrates an example of a user equipment device according to some embodiments.

Embodiments described herein may be implemented into a system using any suitably configured hardware and/or software. FIG. 12 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), preceding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RE circuitry 106 may also include a transmit signal path which may include circuitry to up-convert baseband signals provided by the baseband circuitry 104 and provide RE output signals to the FEM circuitry 108 for transmission.

In some embodiments, the RF circuitry 106 may include a receive signal path and a transmit signal path. The receive signal path of the RE circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include TX/RX switch to switch between transmit mode and receive mode operation. The FEM circuitry may include a receive signal path and a transmit signal path. The receive signal path of the FEM circuitry may include a low-noise amplifier (LNA) to amplify received RE signals and provide the amplified received RF signals as an output (e.g., to the RF circuitry 106). The transmit signal path of the FEM circuitry 108 may include a power amplifier (PA) to amplify input RE signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Example Machine Description

Figure 13:
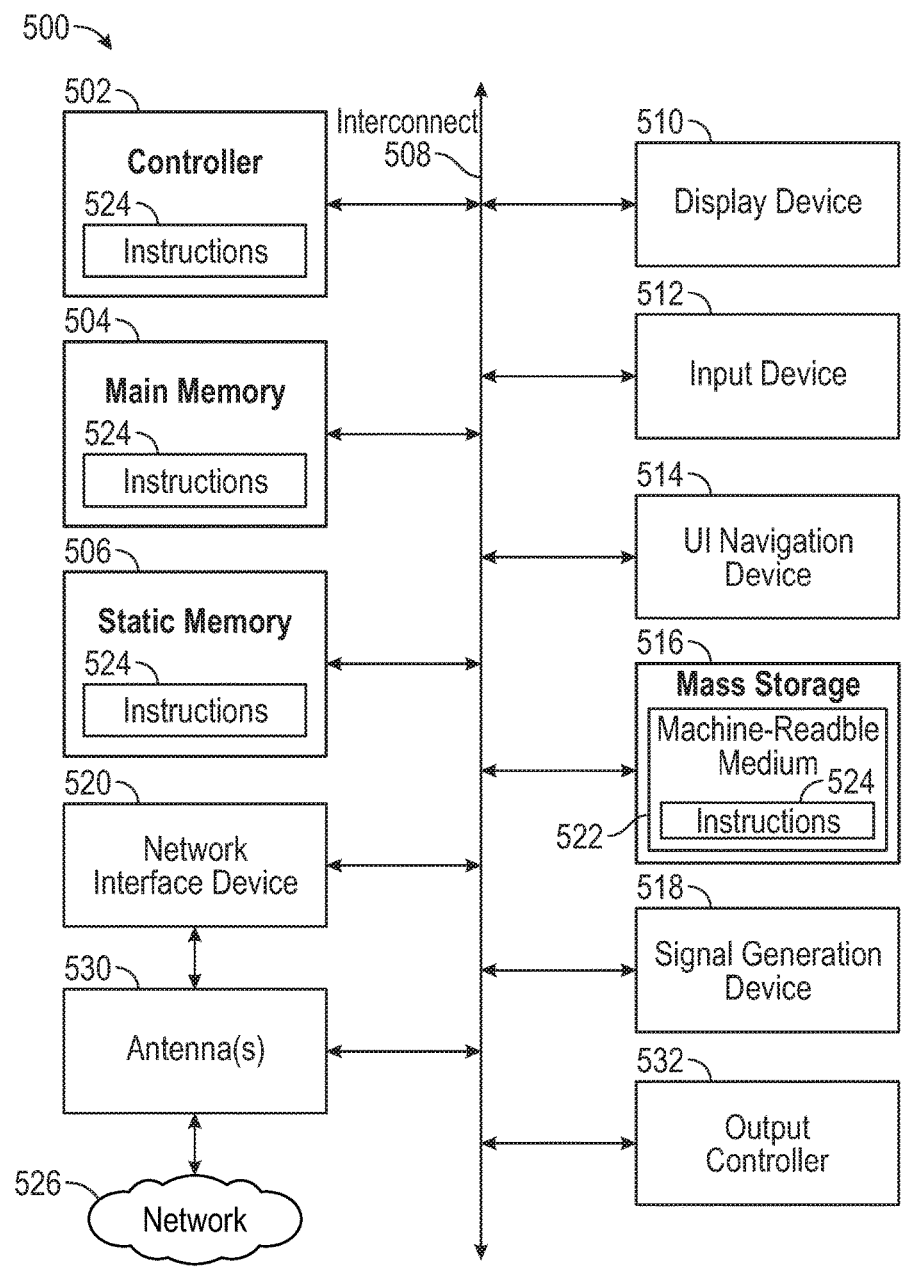
FIG. 13 illustrates an example of a computing machine according to some embodiments.

FIG. 13 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc. Example communication networks may include a local area network (LAN), a wide area network (WAN), a packet data network (e.g., the Internet), mobile telephone networks (e.g., cellular networks). Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISC)) techniques. In some examples, the network interface device 520 may wirelessly communicate using Multiple User MIMO techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes and Examples

In Example 1, an apparatus for a wireless station (STA), comprises: memory and processing circuitry to configure the STA to operate in a wireless network; wherein the processing circuitry is to: demodulate a two-form request-to-send (RTS) frame transmitted from an access point (AP) that requests acceptance of a downlink data transfer and inquires if the STA has uplink data to send via a two-node full-duplex link; encode a two-form clear-to-send (CTS) frame to send to the AP that responds to the two-form RTS frame; and, compute a transmit power level to transmit the two-form CTS frame that is inversely proportional to a measured power level at which the two-form RTS frame from the AP was received.

In Example 2, the subject matter of any of the Examples herein may optionally include wherein the processing circuitry is to compute the transmit power level $P_{Xmit}$ to transmit the two-form CTS frame as:

$$P_{Xmit} = K/P_{AP}(|h_{AP \to D}|)^2$$

where $P_{AP}(|h_{AP \to D}|)^2$ is the measured power level at which the two-form RTS frame from the AP is received by the STA, $P_{AP}$ is the known power level at which the AP transmits the two-form RTS frame, $|h_{AP \to D}|$ is the channel gain from the AP to the STA, and K is a predefined constant to ensure that the computed transmit power does not exceed a maximum power constraint.

In Example 3, the subject matter of any of the Examples herein may optionally include wherein the processing circuitry is to: demodulate a two-form trigger (TRIG) frame from the AP in response to the two-form CTS frame that indicates a two-node full-duplex link is to be setup between the STA and the AP; and, encode uplink data to send to the AP in an uplink data transmission and demodulate downlink data received from the AP in a downlink data transmission in full-duplex mode.

In Example 3a, the subject matter of any of the Examples herein may optionally include wherein the processing circuitry is to append a busy tone to an uplink data transmission if the duration of the uplink data transmission is shorter than the duration of a downlink data transmission.

In Example 3b, the subject matter of any of the Examples herein may optionally include wherein the processing circuitry is to include the duration of the uplink data transmission in the two-form CTS frame.

In Example 3c, the subject matter of any of the Examples herein may optionally include wherein the processing circuitry is to learn the duration of the downlink data transmission from the two-form RTS frame.

In Example 4, the subject matter of any of the Examples herein may optionally include wherein the processing circuitry is to demodulate downlink data received from the AP in half-duplex mode in response to the two-form CTS frame.

In Example 5, the subject matter of any of the Examples herein may optionally include wherein the processing circuitry is to: demodulate a three-form source-request-to-send (S-RTS) frame sent by the AP to candidate STAs apart from the STA that seeks a secondary STA to participate in a three-node source-based full-duplex link where the AP operates in full-duplex mode to send data to the STA and receive data from the secondary STA acting as a source; demodulate a three-form source-trigger (S-TRIG) frame from the AP that indicates the three-node source-based full-duplex link is to be established between the AP, the STA, and the secondary STA; and, demodulate downlink data received from the AP subsequent to the three-form S-TRIG frame.

In Example 6, an apparatus for a wireless station (STA), comprises: memory and processing circuitry to configure the STA to operate in a wireless network; wherein the processing circuitry is to: demodulate a two-form clear-to-send (CTS) frame sent by a primary STA to an access point (AP) that responds to a two-form request-to-send (RTS) frame transmitted from the AP that requests acceptance of a downlink data transfer to the primary STA; measure a received power level of the two-form CTS frame; demodulate a three-form source-request-to-send (S-RTS) frame sent by the AP to the STA and other candidate STAs that requests participation in a three-node source-based full-duplex link where the AP operates in full-duplex mode to send data to the primary STA and receive data from the STA acting as a source; estimate the amount of interference to the primary STA that would be caused by the STA's participation in the three-node source-based full-duplex link from the measured power level of the two-form CTS frame and a predefined transmit power level to be used in the three-node source-based full-duplex link, where the two-form CTS frame is assumed to have been transmitted at a power level inversely proportional to a measured power level at which the two-form RTS frame from the AP was received by the primary STA; if the estimated amount of interference to the primary STA is below a specified threshold, encode a three-way source-based clear-to-send (S-CTS) frame to send to the AP; and, if a three-form source-trigger (S-TRIG) frame is received from the AP, encode uplink data to send to the AP via the three-node source-based full-duplex link or via a half-duplex link as indicated by the three-form S-TRIG frame.

In Example 6a, the subject matter of any of the Examples herein may optionally include wherein the processing circuitry is to, if the amount of interference to the primary STA is estimated to be above the specified threshold, repeat the estimation with a lowered transmit power level.

In Example 7, the subject matter of any of the Examples herein may optionally include wherein the processing circuitry is to estimate the amount of interference INTF to the primary STA that would be caused by the STA's participation in the three-node source-based full-duplex link as:

$$INTF = P_U * P_{measured}$$

where $P_U$ is a predefined transmit power level to be used by the STA for uplink transmissions, $P_{measured}$ is the measured power level of the received two-form CTS frame such that:

$$P_{measured} = P_{Xmit} * (h_{D \to STA})^2$$

where $|h_{D \to STA}|$ is the wireless channel gain between the STA and the primary STA, $P_{Xmit}$ is the power level at which the two-form CTS frame is assumed to have been transmitted by the primary STA such that:

$$P_{Xmit} = K / P_{AP} (|h_{AP \to STA}|)^2$$

where $P_{AP}$ is a known power level at which the AP transmits the two-form RTS frame, $|h_{AP \to STA}|$ is the channel gain from the AP to the primary STA, $P_{AP} (|h_{AP \to STA}|)^2$ is the measured power level at which the two-form RTS frame from the AP is received by the primary STA, and K is a predefined constant to ensure that the computed transmit power does not exceed a maximum power constraint.

In Example 8, the subject matter of any of the Examples herein may optionally include wherein the wireless network employs orthogonal frequency division multiple access (OFDMA) and wherein the processing circuitry is to encode the three-form S-CTS frame on particular subcarriers of an OFDMA symbol as assigned by the three-form S-RTS frame received from the AP.

In Example 9, the subject matter of any of the Examples herein may optionally include wherein the wireless network employs orthogonal frequency division multiple access (OFDMA) and wherein the processing circuitry is to encode the three-form S-CTS frame on particular subcarriers of an OFDMA symbol by selecting a subset of subcarriers from a plurality of pre-allocated subsets.

In Example 10, the subject matter of any of the Examples herein may optionally include wherein the processing circuitry is to encode the three-form S-CTS frame with quantized interference measurement information to aid the AP in selecting among candidate STAs for participation in the three-node source-based full-duplex link.

In Example 10a, the subject matter of any of the Examples herein may optionally include wherein the processing circuitry is to append a busy tone to an uplink data transmission if the duration of the uplink data transmission is shorter than a duration of a downlink data transmission from the AP.

In Example 10b, the subject matter of any of the Examples herein may optionally include wherein the processing circuitry is to include the duration of an uplink data transmission in the three-form S-CTS frame.

In Example 10c, the subject matter of any of the Examples herein may optionally include wherein the processing circuitry is to learn the duration of the downlink data transmission from the two-form RTS frame from the AP.

In Example 11, an apparatus for a wireless access point (AP), comprises: memory and processing circuitry to configure the AP to communicate with other STAs in a wireless network; wherein the processing circuitry is to: encode a two-form request-to-send (RTS) frame that requests a primary STA to accept a downlink data transfer and also inquires if the primary STA has uplink data to send via a full-duplex link; demodulate a two-form clear-to-send (CIS) frame received from the primary STA; if a dual node full-duplex link with primary STA is to be established, encode downlink data for transmission to the primary STA and demodulate uplink data sent by the primary STA in a dual node full-duplex link; if a half-duplex link with primary STA is to be established, encode downlink data for transmission to the primary STA in a half-duplex link; if a three-node source-based full-duplex link between the AP, the primary STA, and one or more secondary STAs acting as uplink sources is to be established, encode a three-form source-request-to-send (S-RTS) frame to be sent to candidate STAs; demodulate any three-form source-clear-to-send (S-CTS) frames sent by candidate STAs and, if a three-node source-based full-duplex link is still to be established, encode a three-form source-trigger (S-TRIG) frame identifying one or more of the candidate STAs that send S-CTS frames as a secondary STA to participate in the three-node source-based full-duplex link, encode downlink data to transmit to the primary STA, and demodulate uplink data received from one or more secondary STAs via the three-node source-based full-duplex link.

In Example 12, the subject matter of any of the Examples herein may optionally include wherein the processing circuitry is to, after demodulating any source-clear-to-send (S-CTS) frames sent by candidate STAs and determining that a three-node source-based full-duplex link is not to be established, encode downlink data to transmit to the primary STA via a half-duplex link.

In Example 13, the subject matter of any of the Examples herein may optionally include wherein the processing circuitry is to include in the S-TRIG frame a transmission duration for the three-node source-based full-duplex link.

In Example 13a, the subject matter of any of the Examples herein may optionally include wherein the processing circuitry is to append a busy tone to a downlink data transmission if a duration of the downlink data transmission is shorter than a duration of an uplink data transmission from either the primary STA or a secondary STA.

In Example 13b, the subject matter of any of the Examples herein may optionally include wherein the processing circuitry is to learn a duration of an uplink data transmission from the primary STA via the two-form CTS frame.

In Example 13c, the subject matter of any of the Examples herein may optionally include wherein the processing circuitry is to learn a duration of an uplink data transmission from a secondary STA via the three-form S-CTS frame.

In Example 14, the subject matter of any of the Examples herein may optionally include wherein the wireless network employs orthogonal frequency division multiple access (OFDMA) and wherein the processing circuitry is to encode the three-form S-RTS frame with information that allocates which particular subcarriers of an OFDMA symbol are to be used by the candidate STA for the S-CTS frame.

In Example 15, the subject matter of any of the Examples herein may optionally include wherein the wireless network employs orthogonal frequency division multiple access (OFDMA) and wherein the processing circuitry is to allocate subsets of OFDMA subcarriers for selection by a candidate STA in encoding an S-CTS frame.

In Example 16, an apparatus for a wireless station (STA), comprises: memory and processing circuitry to configure the STA to communicate in a wireless network; wherein the processing circuitry is to: encode a two-form request-to-send (RTS) frame to be sent to an access point (AP) that requests acceptance of an uplink data transfer and inquires if the AP has downlink data to send to the STA via a two-node full-duplex link; if a two-form clear-to-send (CTS) frame is received from the AP, encode uplink data to send to the AP as triggered by the two-form CTS frame; and, if a three-form destination-request-to-send (D-RTS) frame is received from the AP, wherein the three-form D-RTS is sent by the AP to candidate STAs apart from the STA to seek one or more secondary STAs to participate in a three-node destination-based full-duplex link where the AP operates in full-duplex mode to receive data from the STA and send data to the one or more secondary STA acting as destinations, encode uplink data to send to the AP via the after demodulating a three-form destination-trigger (D-TRIG) frame from the AP.

In Example 17, the subject matter of any of the Examples herein may optionally include wherein the processing circuitry is to encode uplink data to send to the AP when triggered by the two-form CTS frame via either a two-node full-duplex link or a half-duplex link as indicated by the two-form CTS frame.

In Example 18, the subject matter of any of the Examples herein may optionally include wherein the processing circuitry is to demodulate the three-form destination-trigger (D-TRIG) frame sent by the AP after receiving a three-form destination-clear-to-send (D-CTS) frame addressed to the AP from one or more candidate STAs.

In Example 18a, the subject matter of any of the Examples herein may optionally include wherein the processing circuitry is to append a busy tone to an uplink data transmission if the duration of the uplink data transmission is shorter than a duration of a downlink data transmission from the AP.

In Example 18b, the subject matter of any of the Examples herein may optionally include wherein the processing circuitry is to include the duration of an uplink data transmission in the two-form RTS frame.

In Example 18c, the subject matter of any of the Examples herein may optionally include wherein the processing circuitry is to learn the duration of a downlink data transmission from the AP via the three-form D-RTS frame sent by the AP.

In Example 19, an apparatus for a wireless station (STA), comprises: memory and processing circuitry to configure the STA to communicate in a wireless network; wherein the processing circuitry is to: demodulate a two-form request-to-send (RTS) frame sent by a primary STA to an access point (AP) that requests acceptance of an uplink data transfer to the AP; demodulate a three-form destination-request-to-send (D-RTS) frame sent by the AP to the STA and other candidate STAs that requests participation in a three-node destination-based full-duplex link as secondary STAs where the AP operates in full-duplex mode to accept uplink data from the primary STA and transmit data to one or more secondary STAs acting as destinations; estimate the amount of interference that would be caused by the primary STA's participation in the three-node destination-based full-duplex link as a ratio of a measured power level of the two-form RTS frame as received from the primary STA to a measured power level of the three-form D-RTS as received from the AP; if the estimated amount of interference from the primary STA is below a specified threshold, encode a three-way destination-based clear-to-send (D-CTS) frame to send to the AP; and, after a three-form destination-trigger (D-TRIG) frame is received from the AP, demodulate downlink data from the AP via the three-node destination-based full-duplex link.

In Example 20, the subject matter of any of the Examples herein may optionally include wherein the processing circuitry is to estimate the amount of interference that would be caused by the primary STA's participation in the three-node destination-based full-duplex link as an interference ratio INTFR between the measured power levels of the received two-form RTS and three-form D-RTS frames where:

$$INTFR=(P_U*(|h_{STA \to D}|)^2)/(P_{AP}(|h_{AP \to D}|)^2)$$

where $P_U$ is a predefined transmit power level to be used by the primary STA for uplink transmissions, $|h_{STA \to D}|$ is the wireless channel gain between the primary STA and the STA, $P_{AP}$ is a predefined power level at which the AP transmits the three-form D-RTS frame, and $|h_{AP \to D}|$ is the wireless channel gain from the AP to the STA.

In Example 21, the subject matter of any of the Examples herein may optionally include wherein the wireless network employs orthogonal frequency division multiple access (OFDMA) and wherein the processing circuitry is to encode the three-form D-CTS frame on particular subcarriers of an OFDMA symbol as assigned by the three-form D-RTS frame received from the AP.

In Example 22, the subject matter of any of the Examples herein may optionally include wherein the wireless network employs orthogonal frequency division multiple access (OFDMA) and wherein the processing circuitry is to encode the three-form D-CTS frame on particular subcarriers of an OFDMA symbol by selecting a subset of subcarriers from a plurality of pre-allocated subsets.

In Example 23, an apparatus for a wireless access point (AP), comprises: memory and processing circuitry to configure the AP to communicate with other STAs in a wireless network; wherein the processing circuitry is to: demodulate a two-form request-to-send (RTS) frame from a primary STA that requests acceptance of an uplink data transfer and also inquires if the AP has downlink data to send to the primary STA via a full-duplex link; if a half-duplex link with the primary STA is to be established, encode a two-form clear-to-send (CTS) frame indicating a half-duplex link to send to the primary STA and demodulate uplink data sent by the primary STA via a half-duplex link; if a dual node full-duplex link is to be established, encode a two-form clear-to-send (CTS) frame indicating a full-duplex link to send to the primary STA and demodulate uplink data sent by the primary STA via a full-duplex link; if a three-node destination-based full-duplex link is to be established between the AP, the primary STA, and one or more secondary STAs acting as downlink destinations, encode a three-form destination-request-to-send (D-RTS) frame to be sent to candidate STAs; demodulate any destination-clear-to-send (D-CTS) frames sent by candidate STAs and, if a three-node destination-based full-duplex link is still to be established, encode a three-form destination-trigger (D-TRIG) frame identifying one or more of the candidate STAs as a secondary STA to participate in the three-node destination-based full-duplex link, demodulate uplink data transmitted by the primary STA, and encode downlink data to be sent to one or more secondary STAs via the three-node destination-based full-duplex link.

In Example 24, the subject matter of any of the Examples herein may optionally include wherein the processing circuitry is to, after demodulating any D-CTS frames sent by candidate STAs and determining that a three-node destination-based full-duplex link is not to be established, encode a three-form D-TRIG frame indicating a half-duplex link is to be established with the primary STA and demodulate uplink data sent by the primary STA via a half-duplex link In Example 25, the subject matter of any of the Examples herein may optionally include wherein the wireless network employs orthogonal frequency division multiple access (OFDMA) and wherein the processing circuitry is to encode the three-form D-RTS frame with information that allocates which particular subcarriers of an OFMDA symbol are to be used by a particular candidate STA for the D-CTS frame.

In Example 25a, the subject matter of any of the Examples herein may optionally include wherein the processing circuitry is to append a busy tone to the encoded downlink data if a duration of a downlink data transmission is shorter than a duration of an uplink data transmission from the primary STA.

In Example 25b, the subject matter of any of the Examples herein may optionally include wherein the processing circuitry is to learn a duration of an uplink data transmission from the primary STA via the two-form RTS frame.

In Example 25c, the subject matter of any of the Examples herein may optionally include wherein the processing circuitry is to include in the three-form D-TRIG frame a transmission duration for a downlink data transmission.

In Example 26, the subject matter of any of the Examples herein may optionally include a radio transceiver having one or more antennas connected to the processing circuitry.

In Example 27, a computer-readable medium contains instructions to cause a wireless station (STA) or access point (AP), upon execution of the instructions by processing circuitry of the STA, to perform any of the functions of the processing circuitry as recited by any of the Examples herein.

In Example 28, a method for operating a wireless station or access point comprises performing any of the functions of the processing circuitry and/or radio transceiver as recited by any of the Examples herein.

In Example 29, an apparatus for a wireless station or access point comprises means for performing any of the functions of the processing circuitry as recited by any of the Examples herein.

In Example 30, the subject matter of any of the Examples herein may optionally include a radio transceiver having one or more antennas connected to the processing circuitry.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that ay result between each of antennas and the antennas of a transmitting station. In some MIMO embodiments, antennas may be separated by up to $\frac{1}{10}$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the disclosure is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the disclosure is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for information Technology—Telecommunications and Information Exchange between Systems"—Local Area Networks—Specific Requirements—Part 11 "Wireless LAN Medium Access Control (MAC) and Physical Layer (PHY), ISO/IFC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus for a wireless station (STA), comprising:
memory and processing circuitry to configure the STA to communicate in a wireless network;
wherein the processing circuitry is to:
demodulate a two-form request-to-send (RTS) frame transmitted from an access point (AP) that requests acceptance of a downlink data transfer and inquires if the STA has uplink data to send via a two-node full-duplex link;
encode a two-form clear-to-send (CTS) frame to send to the AP that responds to the two-form RTS frame; and,
compute a transmit power level to transmit the two-form CTS frame that is inversely proportional to a measured power level at which the two-form RTS frame from the AP was received.

2. The apparatus of claim 1 wherein the processing circuitry is to compute the transmit power level $P_{Xmit}$ to transmit the two-form CTS frame as:

$$P_{Xmit} = K/P_{AP}(|h_{AP \to D}|)^2$$

where $P_{AP}(|h_{AP \to D}|)^2$ is the measured power level at which the two-form RTS frame from the AP is received by the STA, $P_{AP}$ is the known power level at which the AP transmits the two-form RTS frame, $|h_{AP \to D}|$ is the channel gain from the AP to the STA, and K is a predefined constant to ensure that the computed transmit power does not exceed a maximum power constraint.

3. The apparatus of claim 1 wherein the processing circuitry is to:
demodulate a two-form trigger (TRIG) frame from the AP in response to the two-form CTS frame that indicates a two-node full-duplex link is to be setup between the STA and the AP; and,
encode uplink data to send to the AP and demodulate downlink data received from the AP in full-duplex mode.

4. The apparatus of claim 3 wherein the processing circuitry is to append a busy tone to an uplink data transmission if the duration of the uplink data transmission is shorter than the duration of a downlink data transmission.

5. The apparatus of claim 3 wherein the processing circuitry is to learn a duration of a downlink data transmission from the two-form RTS frame.

6. The apparatus of claim 1 wherein the processing circuitry is to demodulate downlink data received from the AP in half-duplex mode.

7. The apparatus of claim 1 wherein the processing circuitry is to:
demodulate a three-form source-request-to-send (S-RTS) frame sent by the AP to candidate STAs apart from the STA that seeks a secondary STA to participate in a three-node source-based full-duplex link where the AP operates in full-duplex mode to send data to the STA and receive data from the secondary STA acting as a source;
demodulate a three-form source-trigger (S-TRIG) frame from the AP that indicates the three-node source-based full-duplex link is to be established between the AP, the STA, and the secondary STA; and, demodulate downlink data received from the AP subsequent to the three-form S-TRIG frame.

8. An apparatus for a wireless station (STA), comprising:
memory and processing circuitry to configure the STA to communicate in a wireless network;
wherein the processing circuitry is to:
demodulate a two-form clear-to-send (CTS) frame sent by a primary STA to an access point (AP) that responds to a two-form request-to-send (RTS) frame transmitted from the AP that requests acceptance of a downlink data transfer to the primary STA;
measure a received power level of the two-form CTS frame;
demodulate a three-form source-request-to-send (S-RTS) frame sent by the AP to the STA and other candidate STAs that requests participation in a three-node source-based full-duplex link where the AP operates in full-duplex mode to send data to the primary STA and receives data from the STA acting as a source;
estimate the amount of interference to the primary STA that would be caused by the STA's participation in the three-node source-based full-duplex link from the measured power level of the two-form CTS frame and a predefined transmit power level to be used in the three-node source-based full-duplex link, where the two-form CTS frame is assumed to have been transmitted at a power level inversely proportional to a measured power level at which the two-form RTS frame from the AP was received by the primary STA;
if the estimated amount of interference to the primary STA is below a specified threshold, encode a three-way source-based clear-to-send (S-CTS) frame to send to the AP; and,
if a three-form source-trigger (S-TRIG) frame is received from the AP, encode uplink data to send to the AP via the three-node source-based full-duplex link or via a half-duplex link as indicated by the three-form S-TRIG frame.

9. The apparatus of claim 8 wherein the processing circuitry is to estimate the amount of interference INTF to the primary STA that would be caused by the STA's participation in the three-node source-based full-duplex link as:

$$INTF = P_U * P_{measured}$$

where $P_U$ is a predefined transmit power level to be used by the STA for uplink transmissions, $P_{measured}$ is the measured power level of the received two-form CTS frame such that:

$$P_{measured} = P_{Xmit} * (|h_{D \to STA}|)^2$$

where $|h_{D \to STA}|$ is the wireless channel gain between the STA and the primary STA, $P_{Xmit}$ is the power level at which the two-form CTS frame is assumed to have been transmitted by the primary STA such that:

$$P_{Xmit} = K/P_{AP}(|h_{AP \to STA}|)^2$$

where $P_{AP}$ is a known power level at which the AP transmits the two-form RTS frame, $|h_{AP \to STA}|$ is the channel gin from the AP to the primary STA, $P_{AP} (|h_{AP \to STA}|)^2$ is the measured power level at which the two-form RTS frame from the AP is received by the primary STA, and K is a predefined constant to ensure that the computed transmit power does not exceed a maximum power constraint.

10. The apparatus of claim 8 wherein the wireless network employs orthogonal frequency division multiple access (OFDMA) and wherein the processing circuitry is to encode the three-form S-CTS frame on particular subcarriers of an OFDMA symbol as assigned by the three-form S-RTS frame received from the AP.

11. The apparatus of claim 8 wherein the wireless network employs orthognal frequency division multiple access (OFDMA) and wherein the processing circuitry is to encode the three-form S-CTS frame on particular subcarriers of an OFDMA symbol by selecting a subset of subcarriers from a plurality of pre-allocated subsets.

12. The apparatus of claim 8 wherein the processing circuitry is to encode the three-form S-CTS frame with quantized interference measurement information to aid the AP in selecting among candidate STAs for participation in the three-node source-based full-duplex link.

13. The apparatus of claim 8 wherein the processing circuitry is to append a busy tone to an uplink data transmission if the duration of the uplink data transmission is shorter than a duration of a downlink data transmission from the AP.

14. The apparatus of claim 8 wherein the processing circuitry is to include the duration of an uplink data transmission in the three-form S-CTS frame.

15. The apparatus of claim 8 wherein the processing circuitry is to learn the duration of the downlink data transmission from the two-form RTS frame from the AP.

16. A method for operating a wireless station (STA), comprising:
encoding a two-form request-to-send (RTS) frame to be sent to an access point (AP) that requests acceptance of an uplink data transfer and inquires if the AP has downlink data to send to the STA via a two-node full-duplex link;
if a two-form clear-to-send (CTS) frame is received from the AP, encoding uplink data to send to the AP as triggered by the two-form CTS frame; and,
if a three-form destination-request-to-send (D-RTS) frame is received from the AP, wherein the three-form D-RTS is sent by the AP to candidate STAs apart from the STA to seek one or more secondary STAs to participate in a three-node destination-based full-duplex link where the AP operates in full-duplex mode to receive data from the STA and send data to the one or more secondary STA acting as destinations, encoding uplink data to send to the AP after demodulating a three-form destination-trigger (D-TRIG) frame from the AP.

17. The method of claim 16 further comprising encoding uplink data to send to the AP when triggered by the two-form CTS frame via either a two-node full-duplex link or a half-duplex link as indicated by the two-form CTS frame.

18. The method of claim 16 further comprising demodulating the three-form destination-trigger (D-TRIG) frame sent by the AP after receiving a three-form destination-clear-to-send (D-CTS) frame addressed to the AP from one or more candidate STAs.

19. The method of claim 16 further comprising appending a busy tone to an uplink data transmission if the duration of the uplink data transmission is shorter than a duration of a downlink data transmission from the AP.

20. The method of claim 16 further comprising including the duration of an uplink data transmission in the two-form RTS frame.

21. The method of claim 16 further comprising learning the duration of a downlink data transmission from the AP via the three-form D-RTS frame sent by the AP.

22. A non-transitory computer-readable medium containing instructions to cause a wireless station (STA), upon execution of the instructions by processing circuitry of the STA, to
- demodulate a two-form request-to-send (RTS) frame sent by a primary STA to an access point (AP) that requests acceptance of an uplink data transfer to the AP;
- demodulate a three-form destination-request-to-send (D-RTS) frame sent by the AP to the STA and other candidate STAs that requests participation in a three-node destination-based full-duplex link as secondary STAs where the AP operates in full-duplex mode to accept uplink data from the primary STA and transmit data to one or more secondary STAs acting as destinations;
- estimate the amount of interference that would be caused by the primary STA's participation in the three-node destination-based full-duplex link as a ratio of a measured power level of the two-form RTS frame as received from the primary STA to a measured power level of the three-form D-RTS as received from the AP;
- if the estimated amount of interference from the primary STA is below a specified threshold, encode a three-way destination-based clear-to-send (D-CTS) frame to send to the AP; and,
- after a three-form destination-trigger (D-TRIG) frame is received from the AP, demodulate downlink data from the AP via the three-node destination-based full-duplex link.

23. The medium of claim 22 further comprising instructions to estimate the amount of interference that would be caused by the primary STA's participation in the three-node destination-based full-duplex link as an interference ratio INTFR between the measured power levels of the received two-form RTS and three-form D-RTS frames where:

$$\text{INTFR}=(P_U*(|h_{STA\to D}|)^2)/(P_{AP}(|h_{AP\to D}|)^2)$$

where $P_U$ is a predefined transmit power level to be used by the primary STA for uplink transmissions, $|h_{STA\to D}|$ is the wireless channel gain between the primary STA and the STA, $P_{AP}$ is a predefined power level at which the AP transmits the three-form D-RTS frame, and $|h_{AP\to D}|$ is the wireless channel gain from the AP to the STA.

24. The medium of claim 22 wherein the wireless network employ s orthogonal frequency division multiple access (OFDMA) and further comprising instructions to encode the three-form D-CTS frame on particular subcarriers of an OFDMA symbol as assigned by the three-form D-RTS frame received from the AP.

25. The medium of claim 22 wherein the wireless network employ s orthogonal frequency division multiple access (OFDMA) and further comprising instructions to encode the three-form D-CTS frame on particular subcarriers of an OFDMA symbol by selecting a subset of subcarriers from a plurality of pre-allocated subsets.

* * * * *